June 20, 1967     D. A. WELLS     3,326,117
BASKET HANGER FOR DEEP FAT FRYERS
Filed Jan. 20, 1966
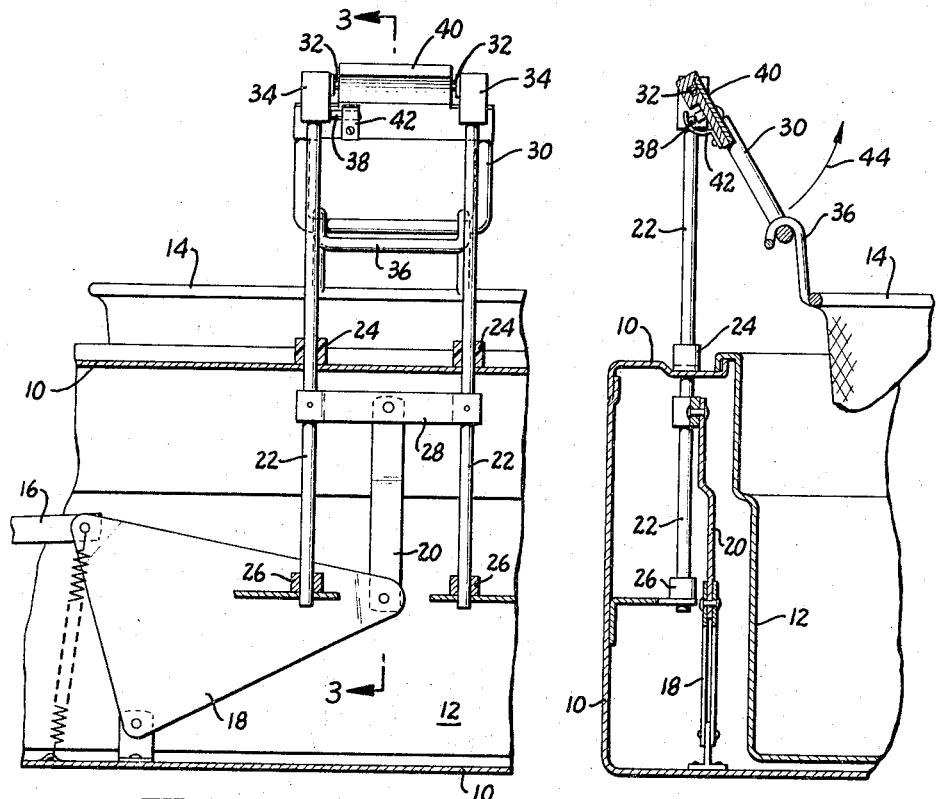
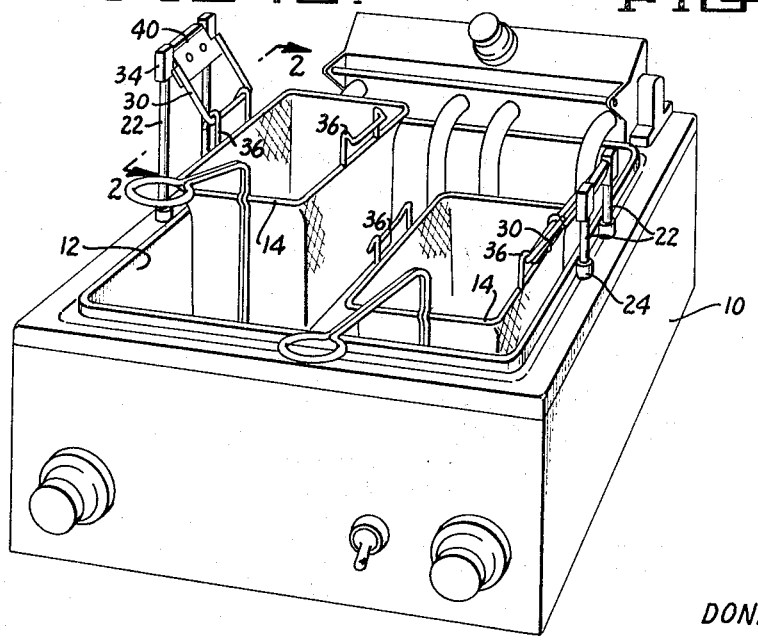
INVENTOR.
DONALD A. WELLS
BY Naylor & Neal
ATTORNEYS 3,326,117
BASKET HANGER FOR DEEP FAT FRYERS
Donald A. Wells, 27 Catalpa Drive,
Atherton, Calif. 94025
Filed Jan. 20, 1966, Ser. No. 521,876
3 Claims. (Cl. 99—411)

This invention relates to basket hangers for deep fat fryers, and this application is a continuation-in-part of my copending application Serial No. 341,718 filed Jan. 31, 1964, for "Synchronous Double Automatic Fryer," now Patent No. 3,242,849.

In the manufacture of deep fat fryers, it is desirable to provide a fryer which occupies a minimum horizontal area so that the fryer will take up as little space as possible in its ultimate installation. For this reason, it is desirable to mount the basket hangers for such a fryer as close to the fry pan as possible, but the hangers should be so mounted that they do not interfere with removal of the frying pan from the fryer so that the pan may be removed for cleaning and preheating of the cooking fat.

Additionally, as indicated in U.S. Patent No. 3,225,681 to George A. Wells, it is desirable to provide means in an automatic fryer which prevent the foraminous basket from being jammed underneath the basket hanger when the hanger is inadvertently moved downwardly while the basket is in the fry pan.

Finally, it is desirable to provide basket hangers which may be used readily in accordance with the invention shown in my above identified application where the same basket hangers may be used for supporting either one large foraminous basket or a plurality of smaller foraminous baskets.

In accordance with this invention I have provided a new hanging mechanism for supporting the foraminous basket in a deep fat fryer whereby all of these desirable features of the fryer may be obtained with a very simple and dependable mechanism.

Other features and advantages of the invention will become apparent from the following description read in conjunction with the attached drawing in which:

FIG. 1 is a perspective view of a double automatic deep fat fryer employing the new hanger of this invention;

FIG. 2 is a sectional view, on a larger scale, of a portion of the apparatus of FIG. 1 as indicated by the line and the arrows at 2—2 in FIG. 1, and FIG. 3 is a sectional view taken along the plane indicated at 3—3 in FIG. 2.

Referring now in detail to the drawings, a deep fat fryer with which the invention may be used is illustrated in FIG. 1 and includes a housing 10 having an opening in the top thereof with a fry pan 12 removably mounted in the opening. A pair of foraminous baskets 14 are removably mounted in the fry pan 12, and the fryer is provided with control means described in the above mentioned co-pending application for automatically raising and lowering the baskets 14 in the tank 12. These control means include one or more periodically operable motors which reciprocate a pair of pull rods 16 and pivot plates 18 to reciprocate a pair of crank arms 20 up and down with the basket 14 to be raised and lowered. Thus, the drive means for the two baskets includes one or more motors connected to a pair of arms 16, rockers 18 and cranks 20. Since the two pairs of arms 16, rockers 18, and cranks 20 are mirror images of each other, only one of the pairs is illustrated to avoid redundancy.

In accordance with this invention, I have provided a new basket hanger which includes a pair of vertical rods 22 mounted in the housing 10 for vertical reciprocal motion adjacent to the edge of the pan 12. The rods are supported in guides 24 on the top of the housing 10 and guides 26 inside the housing, and the two rods are connected together by a cross-bar 28 inside the housing which rigidly holds the two rods together so that they move in unison along a vertical path adjacent to the edge of the tank 12. A basket hanger 30 is pivotally mounted between the upper ends of the rods 22 by means of pivot pins 32 mounted on rigid caps 34 on the top of the rods, and the hanger extends downwardly to a position over the tank 12 where it engages and supports a hook 36 on the basket 14 where one of the hangers supports a single basket, the basket may have a guide portion (not shown) resting against the side of the tank to keep the basket from swinging on the hanger. This guide portion is not used on baskets which are supported jointly by two of the hangers.

A pin 38 is mounted on one of the caps 34 and engages a stop 40 on the hanger 30 to limit downward movement of the hanger with respect to the rod 32. A spring 42 holds the hanger 30 in the position illustrated in FIGS. 2 and 3.

When the lifting mechanism for the rods 22 is inadvertently operated while the basket 14 is in the tank 12, the hanger 30 will not jam the basket and prevent its removal from the tank since the hanger 30 may pivot on pins 32 upwardly as illustrated by the arrow 44 in FIG. 3. Additionally, when it is desirable to remove the fry pan 12 from the housing 10, the two hangers 30 on the lifting rods 22 on opposite sides of the housing may be pivoted upwardly to positions generally coplanar with the rods 22 on which they are supported thereby permitting the pan 12 to be moved upwardly between them.

While one specific form of the invention has been illustrated and described in detail herein, it is obvious that many modifications may be made without departing from the spirit and scope of the invention.

I claim:
1. In a deep fat fryer having a housing with an opening in the top thereof, a pan removably mounted in said opening, at least one basket in said pan for supporting food being cooked in said pan with said basket having a basket support portion, and drive means in said housing for raising and lowering said basket, the improved means for supporting said basket and connecting said basket to said drive means which comprises,
    (A) A frame mounted in said housing for generally vertical movement and extending through said housing adjacent to said opening with said frame positioned laterally from said pan and connected to said drive means for vertical reciprocal motion responsive to operation of said drive means, and
    (B) A hanger mounted on said frame above said housing and pivotally connected to said frame for pivotal movement from a first position projecting laterally from said frame and over said pan in engagement with said basket support portion to a second position outside of the vertically projected area of said pan,
    (C) Whereby said hanger may support said basket in said first position while interfering with removal of said pan from said housing, but may be moved to said second position to permit vertical removal of said pan from said housing.
2. The apparatus of claim 1 characterized further by the inclusion of
    (A) A second frame mounted in said housing for movement parallel to said frame and extending through said housing adjacent to said opening on the opposite side of said opening from said frame with said second frame positioned laterally from said pan and connected to said drive means for vertical reciprocal motion responsive to operation of said drive means, and

(B) A second hanger mounted on said second frame above said housing and pivotally connected to said second frame for pivotal movement from a first position projecting laterally from said second frame and over said pan to a second position outside of the vertically projected area of said pan, (C) Whereby a basket may be jointly supported by and between said hanger and said second hanger while said hangers interfere with removal of said pan from said housing, but said hanger and said second hanger may be pivoted away from each other to permit vertical removal of said pan from said housing.

3. The apparatus of claim 1 in which said frame comprises a pair of vertical rods slidably mounted in said housing at the edge of said tank for reciprocal vertical motion and a cross-bar inside said housing rigidly connected to said rods and connected to said drive means, and said hanger is mounted between the upper ends of said rods and extending from the upper ends of said rods downwardly and inwardly over said tank with said hanger pivotally connected to the upper ends of said rods for upward pivotal movement about a horizontal axis.

References Cited

UNITED STATES PATENTS

| | | | |
|---|---|---|---|
| 1,502,685 | 7/1924 | Sarfaty | 242—205 X |
| 2,868,112 | 1/1959 | Bushway | 99—410 |
| 2,915,000 | 12/1959 | Hetzel et al. | 99—410 X |

BILLY J. WILHITE, *Primary Examiner.*